US009135775B2

(12) United States Patent
Pececnik

(10) Patent No.: US 9,135,775 B2
(45) Date of Patent: Sep. 15, 2015

(54) REMOTE LIVE AUTOMATIC ELECTRO-MECHANICAL AND VIDEO TABLE GAMING

(75) Inventor: Joze Pececnik, Trzin (SI)

(73) Assignee: INTERBLOCK D.D., Menge (SI)

( * ) Notice: Subject to any disclaimer, the term of this patent is extended or adjusted under 35 U.S.C. 154(b) by 745 days.

(21) Appl. No.: 12/752,790

(22) Filed: Apr. 1, 2010

(65) Prior Publication Data

US 2010/0255897 A1 Oct. 7, 2010

Related U.S. Application Data

(63) Continuation of application No. 11/469,987, filed on Sep. 5, 2006, now abandoned.

(60) Provisional application No. 60/715,511, filed on Sep. 9, 2005.

(51) Int. Cl.

*A63F 9/24* (2006.01)
*G07F 17/32* (2006.01)
*A63F 13/30* (2014.01)

(52) U.S. Cl.

CPC .............. *G07F 17/322* (2013.01); *A63F 13/12* (2013.01); *G07F 17/3223* (2013.01); *G07F 17/3241* (2013.01); *G07F 17/3288* (2013.01)

(58) Field of Classification Search

CPC ..... G07F 17/32; G07F 17/3223; A63F 13/12; A63F 2009/2435; A63F 5/0005
USPC ................................................ 463/17, 22, 42
See application file for complete search history.

(56) References Cited

U.S. PATENT DOCUMENTS

| | | | | |
|---|---|---|---|---|
| 4,337,945 | A * | 7/1982 | Levy | 273/142 E |
| 5,588,650 | A * | 12/1996 | Eman et al. | 273/142 B |
| 5,797,795 | A * | 8/1998 | Takemoto et al. | 463/42 |
| 5,803,451 | A * | 9/1998 | Kelly et al. | 273/118 R |
| 5,931,471 | A * | 8/1999 | Bonito | 273/274 |
| 6,083,105 | A * | 7/2000 | Ronin et al. | 463/17 |
| 6,575,834 | B1 * | 6/2003 | Lindo | 463/40 |
| 7,303,473 | B2 * | 12/2007 | Rowe | 463/42 |

* cited by examiner

*Primary Examiner* — David L Lewis
*Assistant Examiner* — Robert Mosser
(74) *Attorney, Agent, or Firm* — Mark A. Litman & Associates, P.A.

(57) ABSTRACT

Electro-mechanical and video table games of chance send video feeds of game play and digital representations of results of game play by network communications to remote clients that receive wagers placed upon the result of the game play and derives a winning or a loss from both the wager and the digital representation of the result of the game play. The table game can include a roulette wheel, a roulette style ball, a device for rotating the roulette wheel at randomly changing rotational speeds, and a device for mechanically propelling the roulette style ball onto the rotating wheel at randomly changing velocities and spins. Also included can be a platform for supporting a die having a plurality of surfaces each bearing indicia unique to that on the other surfaces, and a device for randomly changing the movement and speed of the platform relative to the die.

15 Claims, 6 Drawing Sheets

REMOTE LIVE AUTOMATIC ELECTRO-MECHANICAL AND VIDEO TABLE GAMING

RELATED APPLICATIONS

This application is a continuation application of and claims benefit to co-pending U.S. application Ser. No. 11/469,987 filed Sep. 5, 2006 the disclosure of which claims priority to U.S. Provisional Application Ser. No. 60/715,511, by inventor Jože Pečečnik, filed on Sep. 9, 2005, which is incorporated herein by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to live table gaming, and is more particularly related to an automatic electro-mechanical and video table game that can remotely played by receipt of a live video feed of table game play with table game results.

With the increasing popularity of gaming, gaming competitors increasing enter the gaming marketplace. To remain competitive, each gaming company attempts to distinguish its goods and service from those of other gaming companies. Players, in response to the attention from gaming companies for their business, feel free to be more demanding of gaming companies. These demands include a plentiful supply of games of chance, both live and computer controlled.

Some players prefer computer controlled games such as video slot machines and video poker. As stated in Practical Casino Math, Second Edition (2005), by Hannum and Cabot, at page 64, "[t]oday's computer controlled gaming devices depend upon random number generators (RNG's) to select a 'random' symbol combination and ensure the game's fairness." Some players prefer live table games such as roulette and dice games, perhaps because of distrust for the concepts or workings of RNG's, or because live games are better understood by these players. Another preference for live table games of chance may be due to a player's reliance on tangible sights and sounds that the player uses to form instincts and impressions upon which wagers are considered and placed.

Despite a preference for live table games of chance, several disadvantages are common among players having this preference. A casino will often set a minimum wager amount that can be bet at a live table game. A player who has little resources to make wagers will often be precluded from spending a desirable amount of time playing the live table game. As such, the casino will be unable to realize revenue from those players who would be playing the live table game but for the requirement of a relatively high minimum wager. A casino that cannot or will not accommodate smaller wagers from players will also lose the good will and loyalty of these players because their gaming desires will go unmet.

Some players, whether making large or small wagers, would prefer to play live table games while drawing little or no public attention. If possible, these players would play alone, though they prefer to play live table games over computer controlled table games. Few casinos, however, will provide a staffed table game for just one (1) player, unless that player consistently makes relatively high wagers (e.g., a 'high roller'). Still further, some players would prefer to play table games alone, even without any casino employees attending to the table games. For these players, little choice is available for interactive table game play, other than wagering on games of chance in an anonymous user experience over online communications using the Internet or World Wide Web.

Still other players would prefer to play a leisurely, but live, table game. These players would like to take their time and would like to play without feeling any pressure or encouragement to hurry up and play faster. These players, who do not want to feel rushed when making wagers, are not able to do so at a live table game in a casino because those games must be hurried along by a casino employee who has a duty to accommodate the speed of play desired by other players at the table or by house rules.

In order to satisfy players wanting to play a live table game, a casino must pay wages and benefits to a casino employee who is charge of and supervises the live table game. Moreover, staffed casino security for the table game and its environment is also required to be paid for by the casino. This expense can considerably lower casino profit.

Given the foregoing, it would be desirable to avoid intervention by, and control of, a live table game by a casino worker. It would further be desirable to provide unattended live table game play where the table game is played without a live casino attendant. Accordingly, a need exists for an interactive, real time, networked, unattended, and live table game. A need also exists for such a live table game that can be activated to begin play by a remote client.

A need also exists for such a live table game that can be played without a minimum wager amount, that can be played with no time limit placed upon a player to place a wager, that can be played any time of the day or night, or combinations of the foregoing game variations. By fulfilling these needs, in their various combinations, gaming companies can accommodate players desiring the same and can thereby realize income from these live table gaming arrangements.

BRIEF SUMMARY OF THE INVENTION

Implementations provide for an electro-mechanical and video automatic table game device from which a broadcast is made of a live video feed of play of the table game. The broadcast, which also includes table game results, is made over a network. One or more remote clients can receive the broadcast on the network. Alternative implementations provide a back channel from the remote client to the electro-mechanical and video automatic table game device to remotely initiate play of the table game.

Implementations provide for a network facilitated over satellite, cable television, the Internet, the World Wide Web, a Wide Area Network (WAN), a Local Area Network (LAN), a wireless network, a hard wired network, or combinations thereof. Live table games include roulette, dice games, the big six wheel (wheel of fortune), and board games of chance.

The electro-mechanical and video automatic table game machine plays a game of chance that produces an analog result. The analog result is converted to a digital result for communication, along with a video feed of play at the table game, to a remote client operated by a player. As a function of the player's wager at the remote client and the digital result that is communicated to the remote client, the player's winnings or losses are calculated by the remote client. As such, the remote client need not send any electronic communication to the electro-mechanical and video automatic table game machine, other than to optionally initially activate the electro-mechanical and video automatic table game machine. Rather, the remote client only needs to receive a video feed and electronic result of table game play from the electro-mechanical and video automatic table game machine via a network (e.g., satellite, Cable TV, etc.).

Alternative implementations provide for an electro-mechanical and video automatic table game device that is not remotely activated by a remote client, but is rather continuously operated while a video feed of the game play is broadcast over a channel on a network to one more remote clients. The result of game play is also broadcast over the channel to each remote client that receives the live video feed. Wagers placed at the remote client are processed with the received digital result of game play to derive there from the player's winnings and losses. This monetary derivation can take place wholly at the remote client. The remote client, for instance, can be tuned to a channel of the network to receive the communication, where the network can be a satellite entertainment system or cable television.

Multiple selections can be made of live, or computer generated, games of chance, at least one of which includes an unattended live table game that can optionally be activated by the player via a back channel or other network communication from the remote client for interactive play by the player at the remote client.

A plurality of the electro-mechanical and video automatic table game machines can be placed in one or more unattended locations (e.g., a farm of electro-mechanical and video automatic table game machines in an unoccupied building). Broadcasts are made from each location. A broadcast of respective video feeds of table games from respective electro-mechanical and video automatic table game machines are made to a plurality of remote clients. In some implementations, an option is provided such that each of the remote clients can also send a communication to remotely start up game play at one or more such electro-mechanical and video automatic table game machine. Each electro-mechanical and video automatic table game machine can be so operated by only one remote client, by a plurality of remote clients, or by both.

A plurality of remote clients can interactively play a single electro-mechanical and video roulette or dice gaming machine. To coordinate such live table game play, a user interface on each remote client can have a time clock showing the time that remains to place a wager. At the expiration of the time, the electronic submission of wagers is terminated, further electronic wagers cannot be submitted, and the live action at the table game begins (e.g., a ball is set to rolling around a periphery of the roulette wheel of the electro-mechanical and video automatic roulette gaming machine, or dice are rolled in an electro-mechanical and video automatic die or dice gaming machine). Here, the remaining time to make a wager, and the cut off time for such wages, can be received by broadcast in a transmission over a network to each remote client that is tuned to a corresponding channel on the network.

BRIEF DESCRIPTION OF SEVERAL VIEWS OF THE DRAWINGS

A more complete understanding of the implementations may be had by reference to the following detailed description when taken in conjunction with the accompanying documentation, wherein.

DETAILED DESCRIPTION OF THE INVENTION

Figure 1:
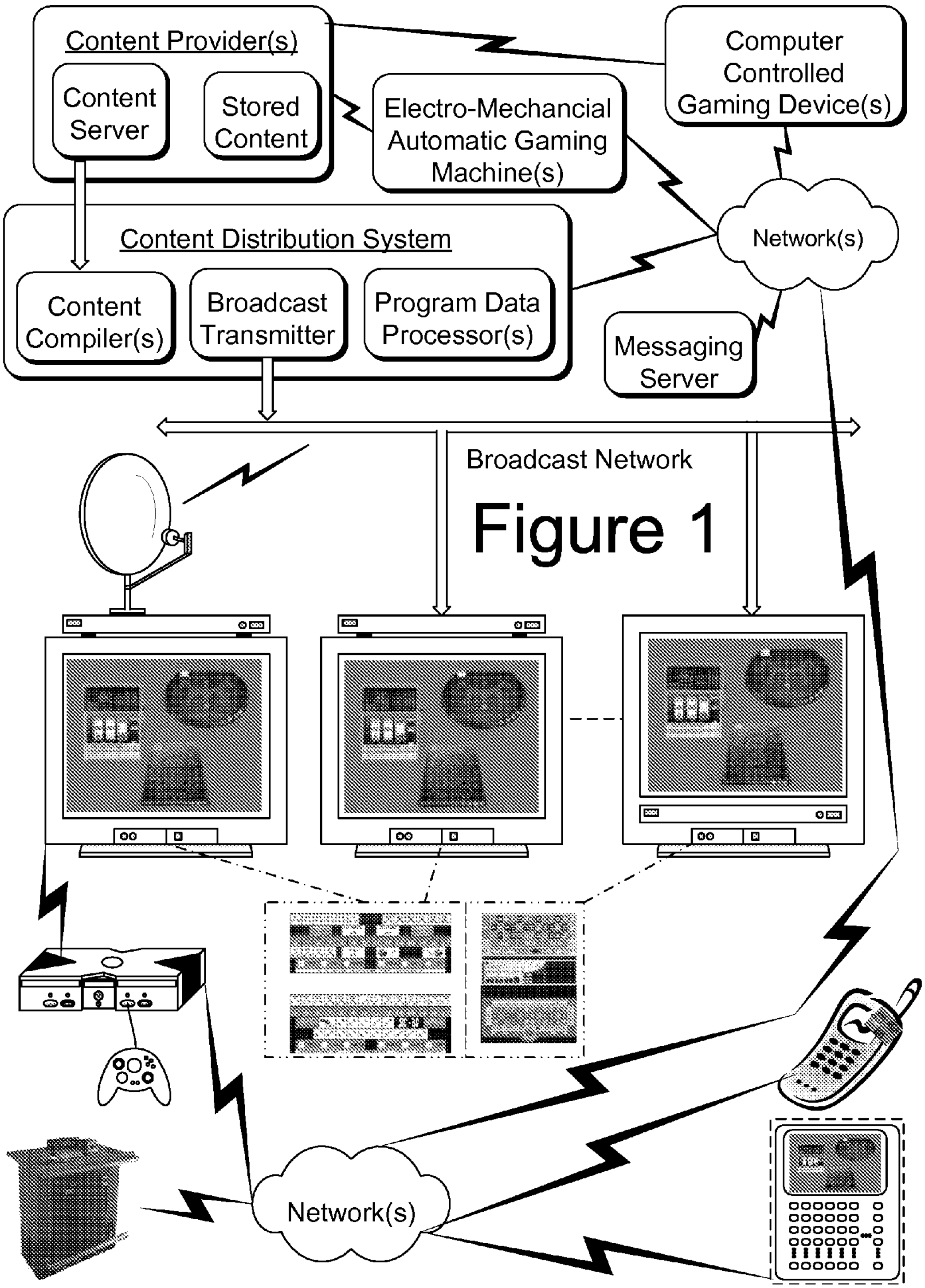
FIG. 1 shows, in an exemplary implementation, a plurality of streaming electronic gaming (e-gaming) environments in which a plurality of clients are in real time multimedia communication over one or more networks with a plurality of electro-mechanical and video automatic table game machines, and with a plurality of computer controlled gaming devices, wherein each client has an option for the user experience of remotely activating and interactively playing: (i) at least one electro-mechanical and video automatic table game machine in live action real time; and (ii) optionally also one or more computer controlled gaming device. Alternatively, electro-mechanical and video automatic table game machines can run their respective table games continuously while continuously broadcasting respective video feeds of table game play and game results there from over a network to a plurality of remote clients that are tuned to respective channels over which these data are broadcast.

An electronic gaming (e-gaming) service allows to a user to operate a client. The client is remote from an electro-mechanical and video automatic table game machine. The electro-mechanical and video automatic table game machine is unattended while operating a live table game. In one implementation, the client sends a communication that remotely activates (starts up) play of the live table game of chance at the electro-mechanical and video automatic table game machine. The e-gaming service controls interactive play of the live table game at the remote client. The electro-mechanical and video automatic table game machine, the e-gaming service, and the client are in multimedia communication over one or more networks. One or more remote clients can interactively operate, both individually and cooperatively, each of one or more of the electro-mechanical and video automatic table game machines over one or more networks.

In other implementations, a remote client can be tuned to a channel that sends a broadcast over a network. The broadcast includes a live video feed from an electro-mechanical and video automatic table game machine that plays a game without an attendant and that broadcasts game results on the channel over the network along with the live video feed. The remote client receives wagers which are used with the game results to calculate winnings and loses at the remote client. One or more remote clients can tune into a network channel to receive a broadcast of both a video feed and game results from one electro-mechanical and video automatic table game machine.

One or more remote clients can be located in a retail establishment, a casino, a place of gaming, etc. For instance, remote clients can be located at a private commercial establishment at which a restricted number of gaming machines are permitted by law. One or more electro-mechanical and video automatic table game machines for unattended operation of a live table game can be located in a warehouse, a retail establishment, a casino, a place of gaming, etc. For instance, a farm of electro-mechanical and video automatic table game machine can be located in an unoccupied building, where the building is attended only by occasional maintenance workers to maintain the building and to provide routine maintenance for the electro-mechanical and video automatic table game machines. Each electro-mechanical and video automatic table game machine has a video camera focused upon the live table game, which optionally can be remotely activated and interactively played by one or more remote clients. A video feed, and optionally an audio feed, from the live table game is communicated by broadcast on a channel over a network to each remote client tuned to the same for interactive game play at the respect remote client.

One or more networks provide multimedia broadcasts (i.e., video, data, and optionally audio) from the electro-mechanical and video automatic table game machines to the remote clients. These networks include, but are not limited to satellite, cable television, the Internet, the World Wide Web, a Wide Area Network (WAN), a Local Area Network (LAN), a wireless network, a hard wired network, and combinations thereof. By way of example, and not by way of limitation, each remote client and electro-mechanical and video automatic table game machine can be networked by techniques described in US Patent Publication No. 2004/0087357 by Johnson (teaches networking computer controlled table game devices), U.S. Pat. No. 5,762,552 issued to Vuong et al., U.S. Pat. No. 6,575,834 issued to Lindo, U.S. Pat. No. 5,830,069 issued to Soltesz et al, or U.S. Pat. No. 6,846,238 issued to Wells (teaches a wireless client in communication with a computer controlled gaming device, where the client can interactively make wagers and play the computer controlled gaming device).

In one implementation, a player can begin play by operating a remote client to select a live table game that is available to be played via a network at an electro-mechanical and video automatic table game machine. Such a selection can be made, in one implementation, via user interface that tunes the remote client to a channel of a network over which game play is being broadcast.

Optionally, the player can choose to be the only player that plays at the electro-mechanical and video automatic table game machine, such as where the player wants to take all the time the player desires between each wager without being rushed by another player or by house rules. Such a choice can be made via a transmission from the remote client to the selected electro-mechanical and video automatic table game machine, such as via a separate network or via a back channel of the broadcast network. Alternatively, the player can virtually join other players that are playing a live table game being operated unattended by an electro-mechanical and video automatic table game machine.

Each player can begin making wagers at a remote client by providing funding to the client. Means for funding the remote client can be as is conventional for video slots, video poker and other such computer controlled gaming devices. Means for funding a remote client that are yet to be developed are also contemplated for use with the present invention.

A player that loses a wager will have that wager deducted from funding previously provided to the remote client. The monetary winnings or loses are derived at the remote client by using the result of table game play that is broadcast on a channel over the network with the video feed of the game play at the table game. The video feed and the result of game play, for each unattended electro-mechanical and video automatic table game machine, can be broadcast on the same channel or on different channels.

A player that wins one or more wagers can receive payment for the one or more wagers at the location of the remote client at which the player made the wager. By way of example, and not by way of limitation, a player can play a client, remote from an electro-mechanical and video automatic table game machine, and located at a casino, gaming company, retail establishment, etc. The remote client, or a printer at the retail establishment, can cause a print out to be made of a receipt or ticket showing that the player has won one or more wagers, the client at which the one or more wagers was won, the game(s) that were played by the player, the date and time of the one or more wagers, one or more globally unique identification (GUID) or transaction numbers, and the amount of the players winnings from the one or more wagers. The player of the remote client can present the printed receipt to an attendant at the retail establishment. The attendant will then pay the player according to the printed receipt. Of course, other forms of payment to the player that wins one more wagers with the remote client are also contemplated, including both conventional ways presently known as well as ways yet to be developed that could be used with the present invention.

Each remote client can be a portal for accepting payment to interactively activate and play an unattended live table game of chance at an electro-mechanical and video automatic table game machine. The remote client can accept funds for wagers from a player, and can digitally receive the analog result of the table game of chance. The digitally received result that was converted from analog can be digitally communicated to the remote client, along with the video feed and over the same network (e.g., satellite, Cable TV, etc.)

In some implementations, calculations of a player's winnings or losses can be made at the electro-mechanical and video automatic table game machine, at a server, at the remote client, or at a combinations of these. The calculation is a function of the player's wager that was accepted at the remote client and the digital result that is communicated to the remote client. The player's funds can be deducted or awarded by the remote client based on the digitally received analog result of the remote live table game play. Thus, in some implementations, the remote client can provide an interactive live gaming experience to a player without sending electronic communications to the electro-mechanical and video automatic table game machine. Rather, the remote client can tune to and receive a broadcast that is limited to a video feed and a digital result of the game being played at the electro-mechanical and video automatic table game machine. The digitized result can there after be further processed with respect to a wager that had been made at a remote client, as well as for display at a user interface of the remote client.

The analog result from the game of chance at the live table game is derived electronically by the electro-mechanical and video automatic table game machine. If the game of change at the electro-mechanical and video automatic table game machine is a roulette game, then an electronic device can be embedded in the roulette wheel to detect and transmit where the ball stops rolling within the roulette wheel. If the game of chance at the electro-mechanical and video automatic table game machine is a dice game, then an electronic device can be embedded in each die to detect and then transmit the result of a roll of the die.

By way of example, and not by way of limitation, electro-mechanical and video automatic table game machines can be provided by the Elektrončck Group (Interblock), which is an international game development and manufacturing company. The Interblock machines can be provided with means for finding an analog result from the game of chance at the live table game such that the analog result is digitized for communication to a user interface. Interblock can provide these gaming machines through one or more of the following entities:

I. The Elektrončck Group (Elektrončck d.o.o.), EGorenjska cesta 23, 1234 Mengeš, Slovenia, phone: +386 1 724 77 10, fax: +386 1 724 77 65, e-mail: info@elektroncek-group.com; and II. Inter Casino Products (ICP), where member companies of the ICP Family are also members of the Elektrončck Group:

A. ICP USA L.C., 6380 S. Valley View Blvd, Suite 104-106, NV 89118, Las Vegas, USA, 1-702-228-0060; and B. Inter Casino Products California LLC, ICP California LLC, 9912 Business Park Drive, Suite 185, CA 95827, Sacramento, USA, 1-916-363-7746.

Interblock, which has developed electromechanical gaming devices, includes (I) electro-mechanical and video roulette table gaming machines and (II) electro-mechanical and video dice gaming machine, both of which are described in Section I and II, below.

Section I: Electro-Mechanical and Video Roulette Table Gaming Machine

The electro-mechanical and video roulette table gaming machine has three (3) variations, each featuring a roulette theme. These three games are the Megastar, Supernova, and Queen. All three of these devices are multi-station devices allowing from as few as 4 to as many as 16 players individual play against the device at a single time. These devices have differences in the shape of the device, the number of players who may participate, and the placement of the wheel on the device.

The device is an electromechanical gaming device with a roulette theme. It is a multi-station device with a roulette style wheel housed under a glass dome. The wheel has alternating red and black numbered spaces around its edges and each numbered space is designed to accommodate a small white ball should it come to rest in any one of the spaces. The wheel continuously rotates and the speed of the wheel is randomly changed by one of three random number generators contained within the device. The other two random number generators dictate the velocity and spin of a roulette style ball which is mechanically propelled onto the spinning wheel during the play of the game. The device may be played by a single player or it can be played by multiple players who initiate play by inserting bill(s), ticket(s) with a monetary value encoded on it, or by deducting credits already accumulated and displayed at a video player station. Players play individually against the device.

Betting patterns and odds are displayed on a player's video station and may also be displayed on the devices' table-top depending on the model of the device. Upon the initiation of play, there is a pre-determined amount of time within which a player can place a bet or bets either by using a keyboard or by touching a video display screen located in front of each individual player. Once this pre-determined time has expired, the device will accept no more bets. Either prior to, or while players are placing bets within the pre-determined time period, a small white ball is propelled from a tube located under the glass dome onto the rotating wheel. Players may not place any more bets once the white ball slows to a pre-determined velocity (although the speed and spin of the ball is randomly determined, the device has the ability to monitor the velocity of the ball so that when it slows to a certain point betting may no longer occur.) Once the ball slows to a point where it comes to rest in one of the numbered slots on the wheel the device determines the winner(s), if any, and, based upon odds and amount wagered, credits the appropriate amount to the player(s)' account(s) (credits won may either be used for additional play or may be redeemed for cash.) At this time, the ball disappears into a tube beneath the wheel and players may again begin the process of placing wagers. Each player plays individually against the device and the outcome of a game is determined solely by chance. A complete game takes approximately 60 seconds; however, game speed may be controlled in one-second intervals so that a game may play between 60 and 90 seconds.

Before a player may operate Interblock's device, the player must first place a wager by inserting bill(s), ticket(s) with a monetary value encoded on it, or deducting credits already accumulated from previous games and displayed at a video player station. It is this insertion of money, ticket or redemption of accumulated credits which causes Interblock's device to operate.

Once a bet has been placed, a small white ball is propelled out of a tube onto the spinning roulette-style wheel housed under a dome on the device. Both the speed of the wheel and the velocity and spin of the wheel are determined randomly and are out of the player's control. The outcome of the game is known once the ball slows to the point where it comes to rest in one of the colored and numbered slots on the wheel. There is no player manipulation of where or when the ball stops. The game is controlled entirely by its three random number generators.

Players who play against Interblock's device do so for the opportunity to win money or credits that may be used for future play or redeemed for cash. Once the ball slows to a point where it comes to rest in one of the numbered slots on the wheel, the device determines the winner(s), if any, and, based upon odds and amount wagered, credits the appropriate amount to the player(s)' account(s).

Interblock's device is designed with video display graphics allowing a player to observe a virtual roulette betting layout including the odds for a bet. The video display also permits a player to review, among other things, the rules of play, results of a game, amount wagered, amount won or lost, and remaining credits, if any. Interblock's device provides a method for viewing the outcome and other information regarding the playing of games thereon or therewith.

Section II: Electro-Mechanical and Video Dice Gaming Machine

The electro-mechanical and video dice gaming machine features a theme of the Asian game known as Sic Bo. Sic Bo is a multi-station device allowing 5, 6 or 8 players to engage in individual play against the device at a single time in each game played. This is a multi-station device with three cubes on a circular 50 centimeter surface housed under a glass dome. Each cube has numbers on each side ranging from one to six. One cube is black and the other two cubes are white. The cubes are shaken by an automated platform in the center of the device. The platform is operated by random number generators contained within the device. The device may be played by a single player or it can be played by multiple players who initiate play by inserting bill(s), ticket(s) with a monetary value encoded on it, or by deducting credits already accumulated and displayed at a video player station. Players play individually against the device. Betting patterns and odds are displayed on a player's video station and may also be displayed on the device table top depending on the model of the device. To begin play, the player places a wager from the player station on one or more of the possible results. After all bets are made, the game is initiated by the device computer that puts the plate on which the three cubes are resting into a vibrating motion. The vibrating plate, or table, causes the cubes to shake and roll around the table for thirty seconds. When the table ceases vibrating and the cubes come to rest, there is an array of electronic sensors that read the cubes to determine cube location and value. The sensors can read the cubes since each side of each cube has a contactless card that represents the number on that side. This data is sent to the device computer and presented to the player on the player station LCD screen. The pays for the winning results range from 1 to 180 times the amount wagered.

Before a player may operate Interblock's device, the player must first place a wager by inserting bill(s), ticket(s) with a monetary value encoded on it, or deducting credits already accumulated from previous games and displayed at a video player station. It is this insertion of money, ticket or redemption of accumulated credits that causes Interblock's device to operate.

Once a bet has been placed, the platform in the center of the table commences to vibrate which causes the cubes to roll about the platform. The movement and speed of the platform are determined randomly and are out of the player's control. The outcome of the game is known once platform ceases its movement and the three cubes come to rest with one of each cube's six sides face up. There is no player or operator manipulation of where or when the cubes stop. The game is controlled entirely by its random number generators. The operation of Interblock's device is controlled by its computer program and is unpredictable and governed by chance.

Players who play against Interblock's device do so for the opportunity to win money or credits that may be used for future play or redeemed for cash. Once the cubes come to rest on the platform, the device determines the winner(s), if any, and, based upon odds and amount wagered, credits the appropriate amount to the player(s)' account(s).

Interblock's device is designed with video display graphics allowing a player to observe the odds for a bet. The video display also permits a player to review, among other things, the rules of play, results of a game, amount wagered, amount won or lost, and remaining credits, if any. Interblock's device provides a method for viewing the outcome and other information regarding the playing of games thereon or therewith.

Whether the electro-mechanical and video gaming features a dice or roulette table game, each can be modified, in a further implementation, to make a video image of live action at the table game in real time. Rather the using electronic devices to detect the result of game play, the video images of the game play can be analyzed, in real time, to derive from the video images the result of the game of chance. The derived result can be broadcast, along with the video feed, on a channel to which a remote client is tuned. The remote client can then further process the result to derive winnings and loses with respect to one or more wagers placed at the remote client by the player, and a visual display of the received result can be rendered upon a user interface at the remote client. A display of winnings and loses can also be displayed.

In still further implementations, in contrast to the foregoing, a system can be implemented to permit data to flow bi-directionally over one or more networks between remote clients and an e-gaming service that operates one or more electro-mechanical and video automatic table game machines. In such implementations, calculations of winnings and loss can occur at the e-gaming service, at the remote client, or at both places. This flow of data can include data for a player's choice of a table game, placement of a bet, digital receipt of an analog result of a live table game, multimedia streaming of the live table game action including video and optionally audio of electro-mechanical placements and movements of the elements and objects of the table game of chance (dice, ball, wheel, etc.).

A remote client, in addition to facilitating game play, can also accommodate computer controlled games of chance to be played, if so chosen by the player. Here, funding, wagers, and winnings can be handled at the remote client as has been described above.

Other forms of multi-media entertainment can be offered by the e-gaming service at the remote client, including movies, television, advertisements, and Internet and World Wide Web access. The remote client can also accept payment for order in an e-commerce application, such as ordering food, beverages, goods, and services for delivery anywhere including by room service at a hospitality establishment. Here, the e-commerce application can deliver to the remote client various product descriptions, images, and pricing, can facilitate building an electronic shopping cart filled with items electronically ordered at the remote client. The e-commerce application at the remote client can also initiate and completing a checkout process for the player's electronic shopping cart. The player can add additional products and services to the electronic shopping cart, change quantities, and remove items using the e-commerce component of the e-gaming service.

Privacy, security, and accessibility are provided to each player at a remote client via the inventive e-gaming service, which can be interoperable with conventional and future operating systems, platforms, open and proprietary software systems, and World Wide Web browser application software (e.g., Internet Explorer, Firefox, America Online, personal computers and Apple Macintosh, etc.).

A variety of electro-mechanical and video automatic table game machines are contemplated, each of which can be altered to accommodate the functionality as described herein. Such alternations include, but are not limited to, removing all or none of the user interface functionality physically located at the electro-mechanical and video automatic table game machine, and adding the previously described broadcast, network, or both broadcast and network communications with one or more remote clients each having a user interface for playing a live table game performed unattended at one of more electro-mechanical and video automatic table game machines. Functionality at the electro-mechanical and video automatic table game machine can optionally include communications capability to receive a remote activation demand from a remote client to begin interactive unattended live table play (e.g., to start up the game). The remote client can receive, and an electro-mechanical and video automatic table game machine can send, a live video feed and an optional audio feed over a network to the remote client.

FIG. 1 shows, in an exemplary implementation, a plurality of streaming e-gaming environments. Each environment can have a plurality of clients that are in real time multimedia communication over one or more networks with a plurality of electro-mechanical and video automatic table game machines. A plurality of computer controlled gaming devices are also seen in FIG. 1. Each client is remote (not at the same physical, geographic location) from an electro-mechanical and video automatic table game machine with which it is in communication through one or more networks.

Each client, through a user interface having an input device, has an option to provide the user experience of remotely activating upon demand and interactively playing one or more electro-mechanical and video table game machines in live action real time game play. Alternatively, each client can also have the option to play one or more computer controlled gaming devices, which can also be remote from the client. By way of example, and not by way of limitation, such multiple games can be offered for play at each remote client by various techniques, including but not limited to the techniques described in US Pat Pub No 2004/0087357 by Johnson.

The user interface, thickness or thinness, form factor, and general functionality of the remote client can be as illustrated in FIG. 1. By way of example, and not by way of limitation, the form factor and functionality can include a set top box, a wired or wireless personal digital assistant (PDA), a cellular telephone compatible of receiving multimedia streams (e.g., including but not limited to G2 through G4 telecommunications functionality), a bar top video gaming machine (video poker, video slot machines, etc.), a wired or wireless personal computing device (PC, laptop, palmtop, desktop, etc.), a game console platform in wired or wireless communication with a display device, and the like.

Each remote client, as seen in FIG. 1, receives, but need not send, communications from an e-gaming service over one or more networks, including but not limited to broadcasts upon channels via satellite, cable television, the Internet, the World Wide Web, a Wide Area Network (WAN), a Local Area Network (LAN), a wireless network, a hard wired network, and combinations. In some implementations, the communications to the remote client are 'one-way'. This one-way communication that is received by each remote client includes at least a video feed from an electro-mechanical and video automatic table game device and an digital result from game play at the electro-mechanical and video automatic table game device. By way of example, the remote client be tuned to a satellite or cable TV channel over which both the video feed and the digital result from game play is broadcast for processing at the remote client.

Each electro-mechanical and video automatic table game device, and optionally one or more computer controlled gaming devices, can communicate with the remote clients through one or more content providers associated with one or more head end(s) of a satellite or cable television service provider. A messaging server can optionally be used to deliver messages via networked communications between remote clients and electro-mechanical and video automatic table game machines.

Figure 2:
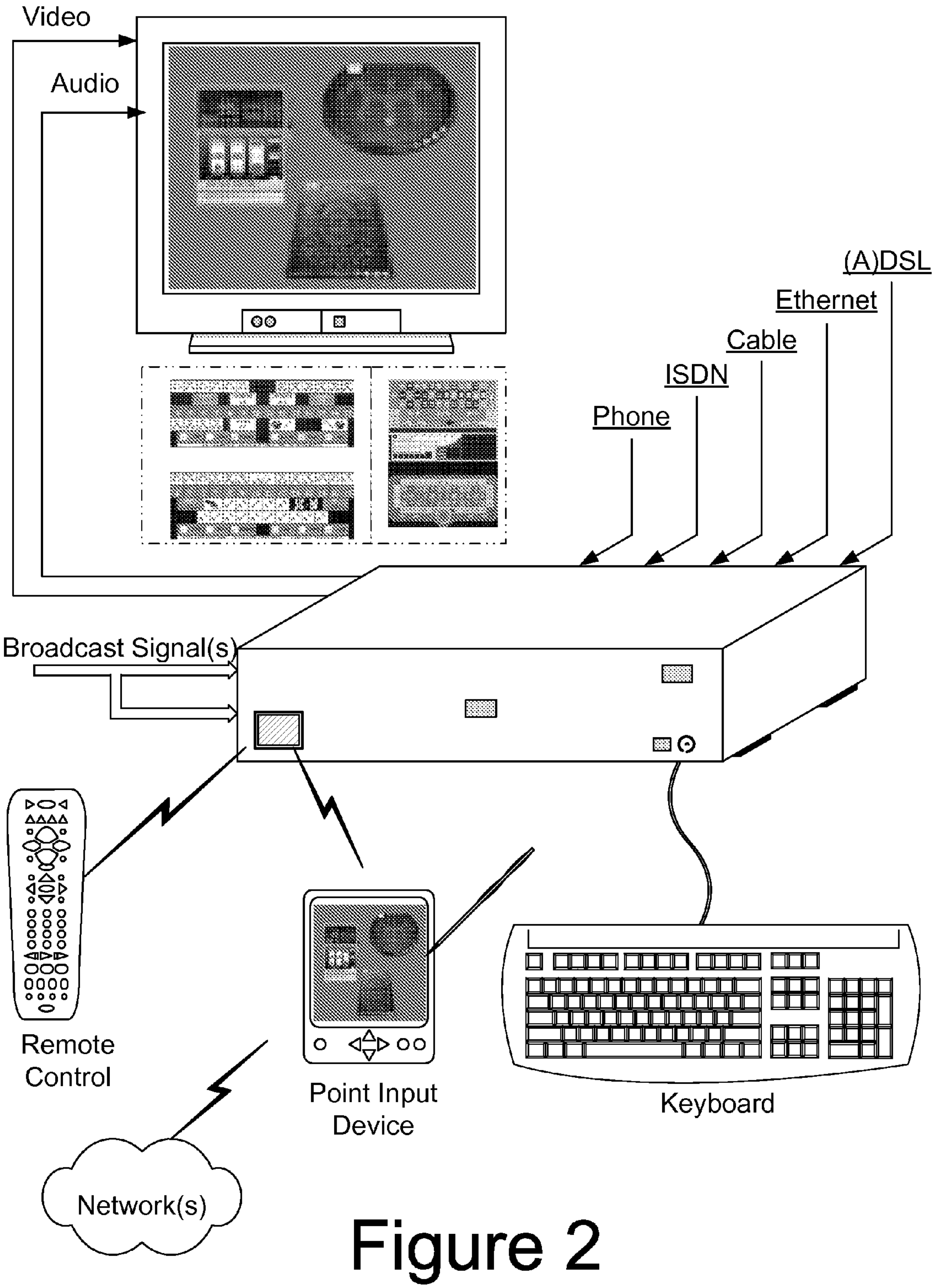
FIG. 2 shows, in an exemplary implementation, a set top box/Digital Video Recorder (DVR) which can be used as a remote client in one or more of the environments of FIG. 1.

FIG. 2 shows, in an exemplary implementation, a set top box (STB) as a remote client for receiving a video feed and table game results by broadcast from a satellite or cable television service provider. The STB has one or more options for providing a user interface with input device(s), including but not limited to a keyboard, an input pointing device, and a remote controller apparatus, each of which can be in wired or wireless communication with the STB and optionally with the illustrated network. A further option is a bi-directional communication capability between STB and one or more an electro-mechanical and video automatic table game devices. One such bi-directional capability can be provided by a back channel in a broadcast network. As such, the remote client can be useful in one or more of the environments seen in FIG. 1.

Figure 3:
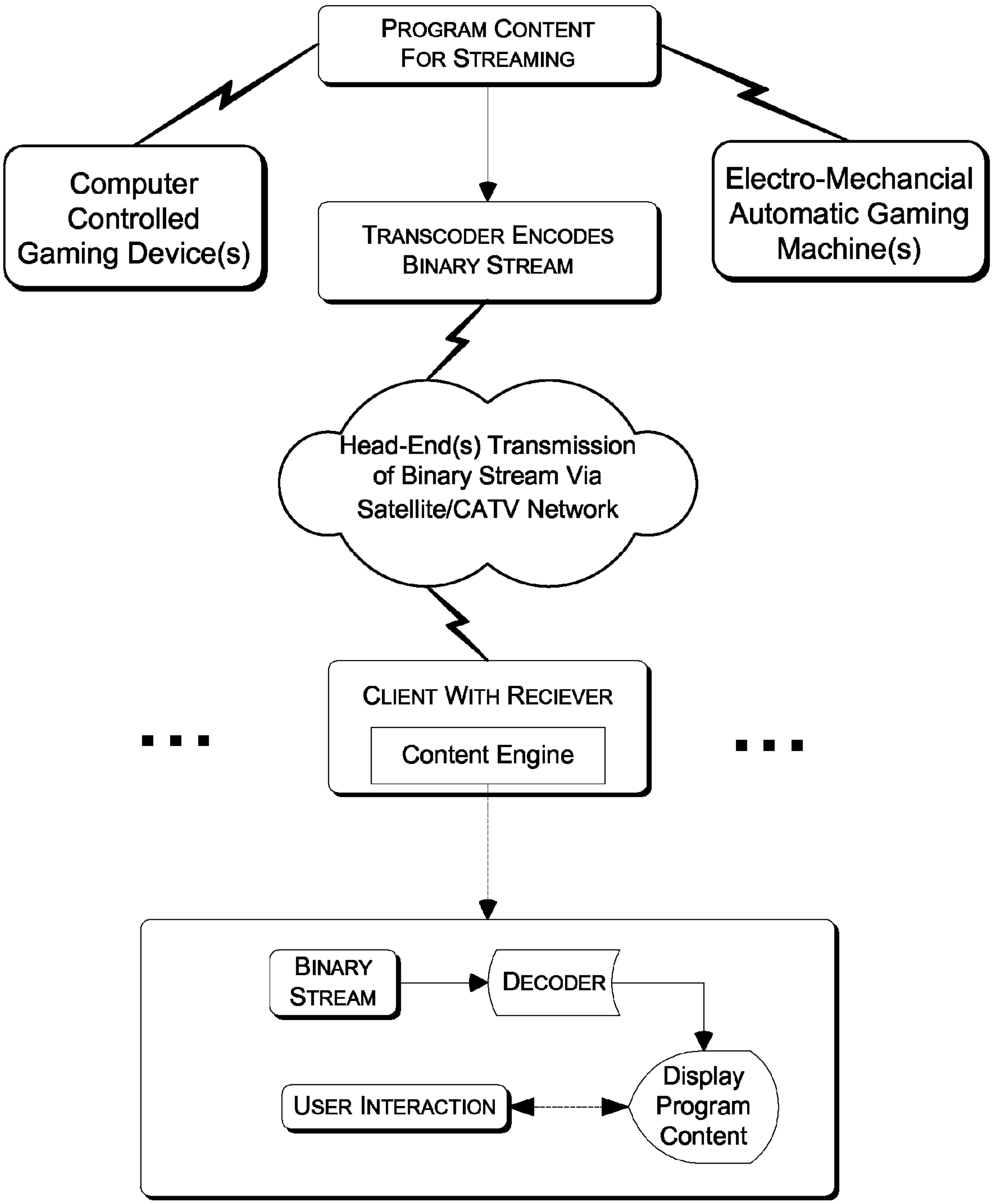
FIG. 3 shows, in an exemplary implementation, a satellite/CATV network for streaming real time live e-gaming content to a remote client by broadcast over a network from (i) at least one electro-mechanical and video table game machine in live action real time; and (ii) optionally also one or more computer controlled gaming device.

FIG. 3 shows, in an exemplary implementation, further detail of one or more remote clients in a satellite/CATV network for streaming real time live e-gaming content from an electro-mechanical and video automatic table game device for the interactive playing of a table game of chance, and optionally also for the interactively activating and playing of a computer controlled game of chance. Both the electro-mechanical and video automatic table game device and the computer controlled game of chance are in communication, wired or wirelessly, with a means for providing streaming of program content. A transcoder encodes a binary stream of the program content, which includes multi-media streaming content from the electro-mechanical and video automatic table game device. One or more head-ends make a transmission of the binary stream via the satellite/CATV network. Each remote client that receives the transmitted binary stream will decodes the content for display and interactive use in the e-gaming application being executed at the remote client.

Figure 4:
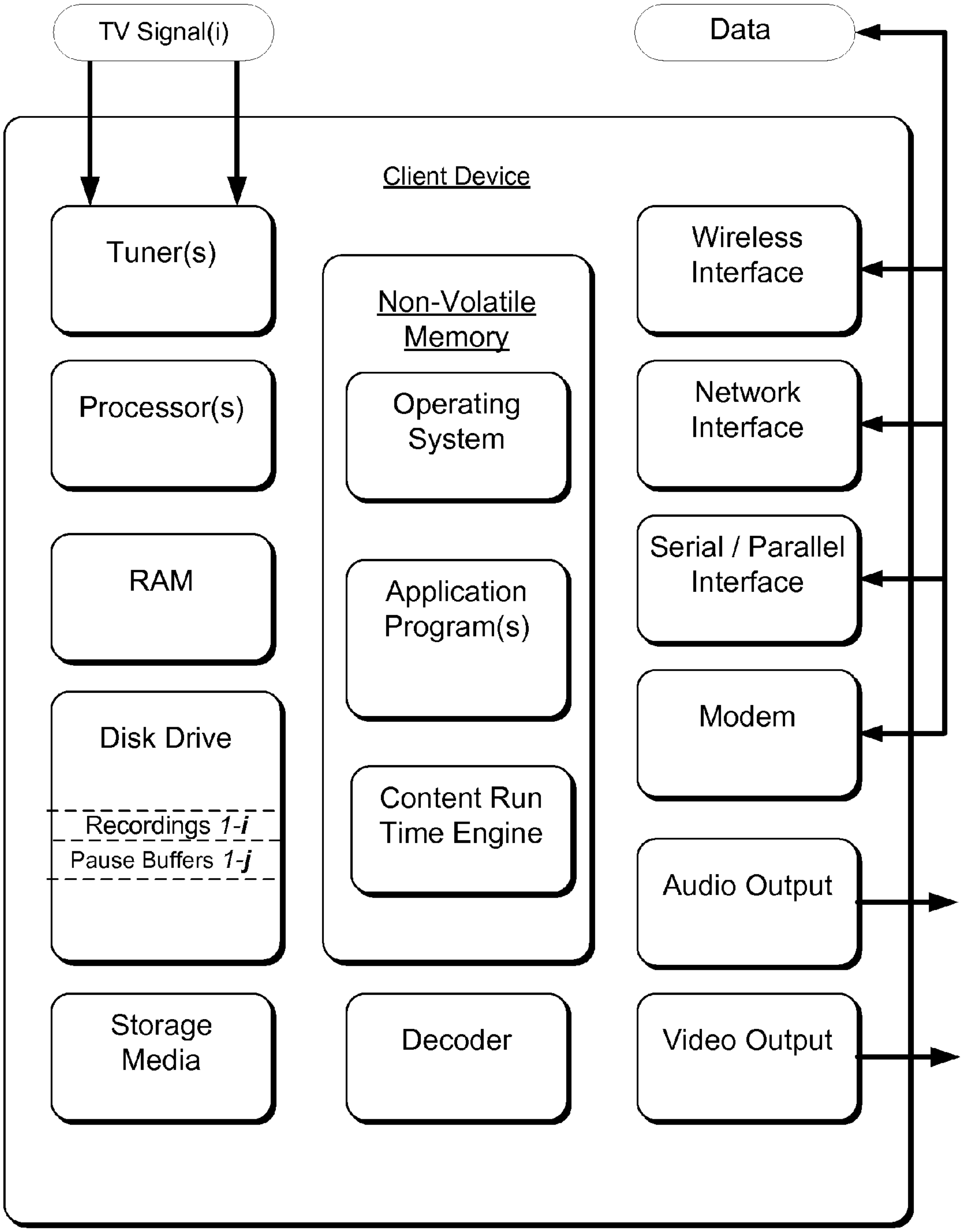
FIG. 4 shows, in an exemplary implementation, functionality for a remote client used in one or more of the environments of FIG. 1, including for receiving streamed multimedia for a real time, interactive, live e-gaming user experience.

FIG. 4 shows, in an exemplary implementation, functionality provided by components of a remote client. The remote client illustrated in FIG. 4 can be used in one or more of the environments of FIG. 1, including for receiving streaming multimedia so as to provide a real time, live e-gaming, interactive user experience.

Figure 5:
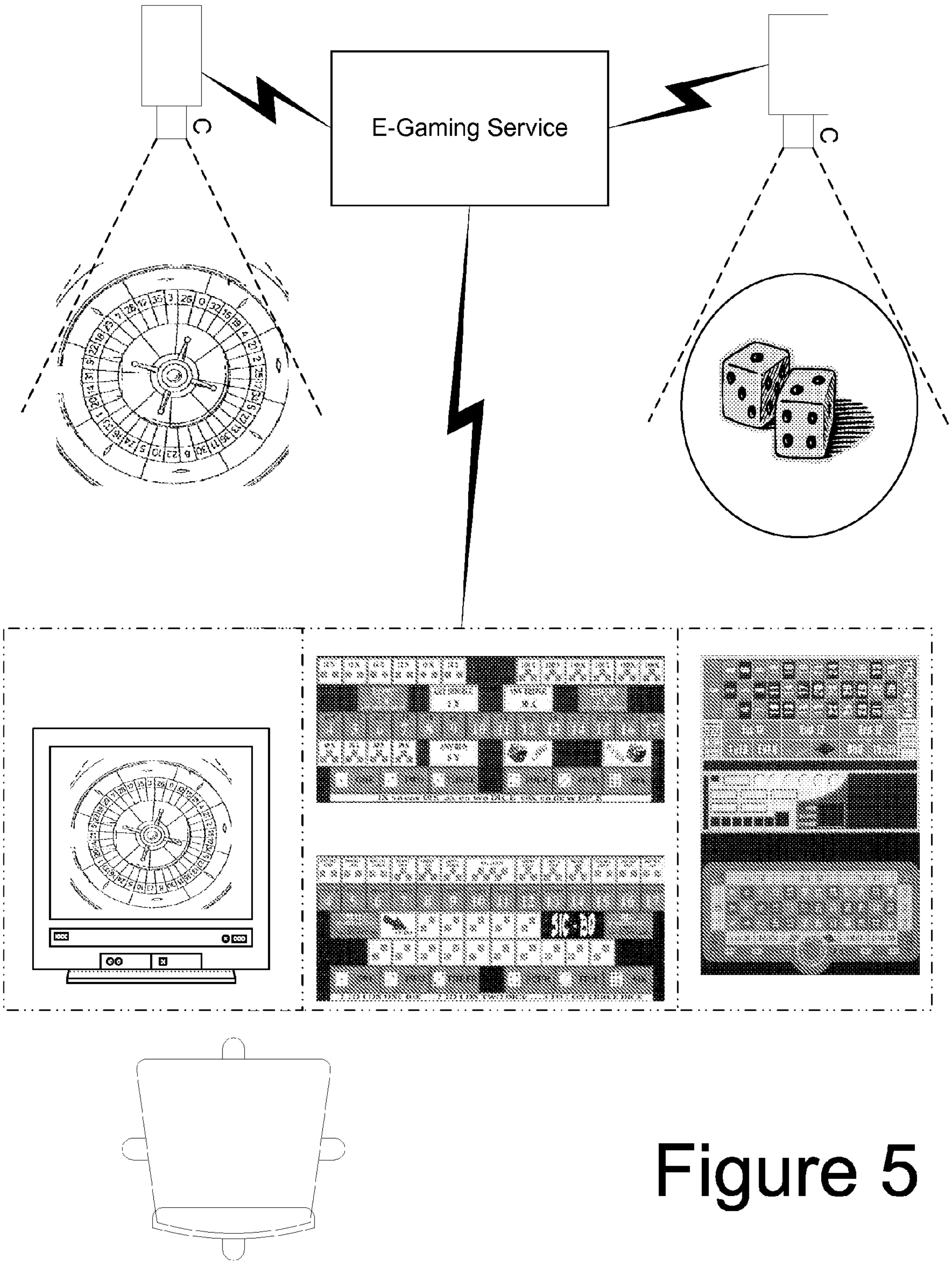
FIG. 5 shows, in an exemplary implementation, respective video cameras capturing live play alternately at a roulette wheel and at a dice game, where table game results and video feeds are broadcast, optionally upon demand of a remote client networked with the table games, to the remote client for display simultaneously with a user interface corresponding to the live video feed, where the live video feed and user interface provide an interactive user gaming experience at the remote client such as in the environments of FIG. 1.

FIG. 5 shows, in an exemplary implementation, two (2) video cameras. Each camera captures live play at a table game. One camera captures live play of a roulette wheel and the other captures live play at a dice game. Both the roulette wheel and the dice game are unattended and function as an electro-mechanical and video automatic table game device. One of the video feeds is communicated or broadcast to a remote client, as shown, when requested by the client (e.g., by the client tuning to the broadcast). By way of illustration, and not by way of limitation, the video feed can be accomplished by techniques described in U.S. Pat. No. 6,575,834 issued to Lindo or U.S. Pat. No. 6,908,385 issued to Green (teaches making video and audio recordings of live table games for a casino video security system that is provided where a camera is focused upon live table games in a casino environment).

A request for a live video feed is made using an user interface at a remote client. The client can request a video feed from either table game, as shown in FIG. 5. In some implementations, the player at the client can initiate game play and then and experience live interactive play at the table game as facilitated by the player-selected electro-mechanical and video automatic table game device. As such, the remote client is networked with an e-gaming service to provide bi-directional communications. With the player-selected live video feed, a display of the video feed is made at the client.

A user interface can include a touch sensitive screen, keyboard, or other input device that is provided for interactive play of a player. Various user interfaces can be provided for various remote clients. Each user interface is adapted, and provides functionality, for playing a live table game of chance, such as roulette, dice games, the big six wheel or wheel of fortune (not shown), and board games of chance. As such, the user interface at the remote client will preferably correspond to the type of table game of chance being captured in the demand live video feed. The player sees a display of the live video feed and uses the user interface to place wagers at the remote client. Results of game play corresponding to the live video feed are broadcast to the remote client, so as to provide an interactive user experience of playing a table game of chance, such as is illustrated in one or more of the environments seen in FIG. 1.

Figure 6:
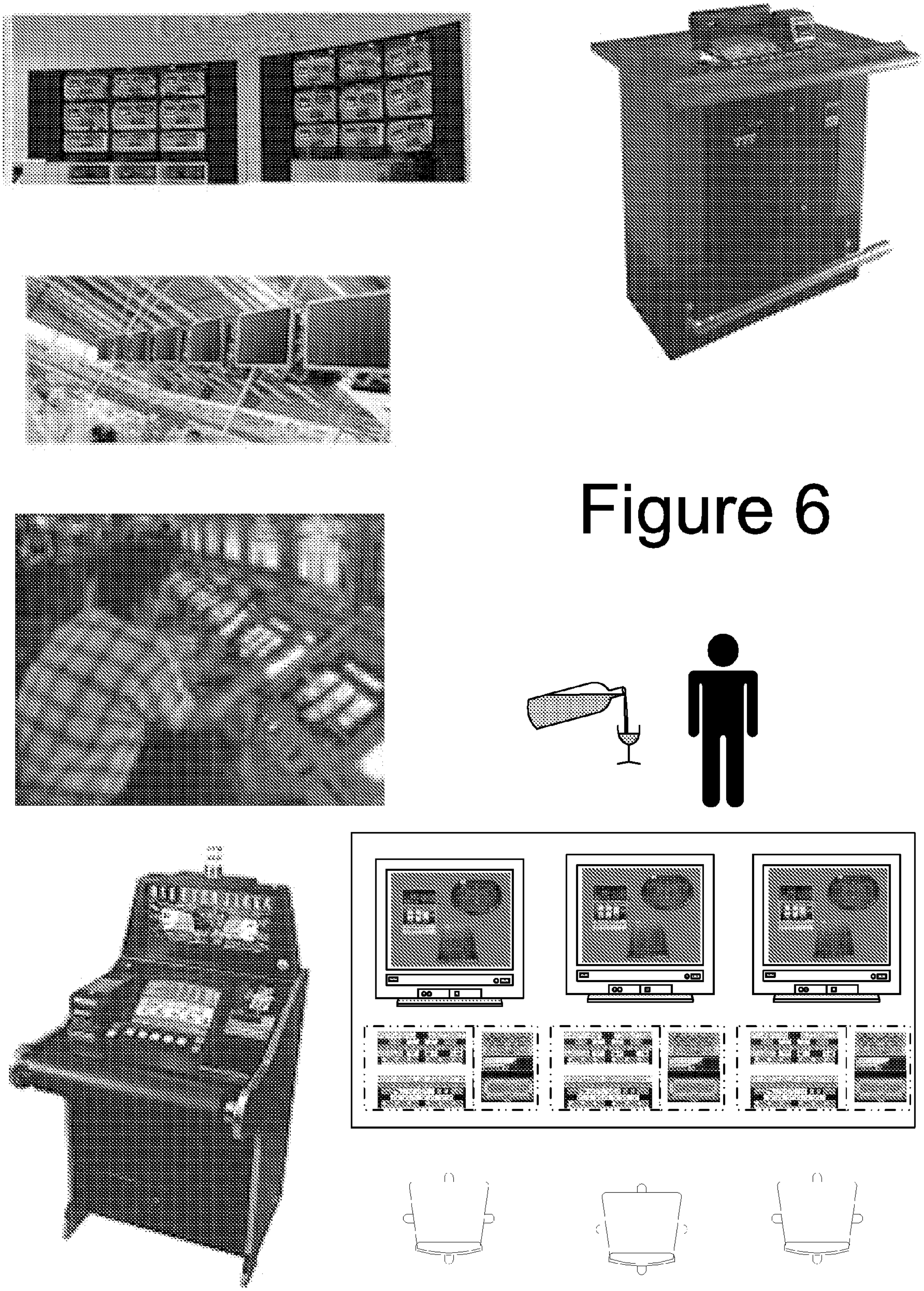
FIG. 6 shows, for each of several exemplary implementations, one or more remote clients in one geographic location as can be situated within the environments of FIG. 1, wherein each remote client provides a user interface corresponding to the live table game being played using an electro-mechanical and video automatic table game device.

FIG. 6 shows, for each of several exemplary implementations, a suggested form factor, respectively, for various remote clients. Each remote client seen in FIG. 6 is in one geographic location that can be within one or more of the environments seen in FIG. 1. A user interface is provided at each remote client for use in an implementation with respect to FIG. 2. One or more remote clients can be embedded into a bar top. Each such remote client, whether standalone or clustered together and embedded into a single bar top surface, can be played by a patron of the bar while the patron is being attended by a bar tender. The bar tender can also attend to paying winnings to the patron when a wager by the patron at the remote client results in winnings As such, the bar top, the bar establishment, or each client can have a printer (not shown) to print out a hardcopy of a receipt or ticket (not shown) that memorializes and provides evidence of the winnings, as described elsewhere herein. Another printer, or other internal controls providing similar functionality, can be provided at the geographic location so as to provide a similar receipt or like indicia of winnings. These two receipts can then be compared for accuracy and precision, thereby mitigating opportunities for the counterfeiting of receipts and/or other incidents of transactional fraud. In one implementation, there are a plurality of remote clients that are embedded into a bar top in a tavern or other retail establishment, where the establishment is a geographic location at which the number of gaming machines is restricted by gaming regulations.

A plurality displays can be clustered together, as shown in FIG. 6, each of which corresponds to a separate user interface for a separate player. The user interface is used to remotely play the e-gaming service as described herein, where the video feed from the electro-mechanical and video automatic table game machine is displayed upon a corresponding display in the cluster of displays.

In a still further implementation, remote clients can be clustered together. Such a clustering, as seen in FIG. 6, would be as is convention with slot machines, video poker machines, video slot machines, etc. in an unrestricted location such as a casino or other geographic location at which the number of gaming machines is unrestricted by gaming regulations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An electro-mechanical automatic gaming machine system comprising:

a video camera;

an electro-mechanical automatic gaming machine adapted to:

mechanically generate an analog result of game play in an automatic manner without any player control and electronically convert the analog result into a digital result; and transmit a live video feed of the game play recorded by the video camera to a plurality of remote clients operated by a plurality of players to allow the plurality of remote clients to place wagers on a future result of the game play.

2. The electro-mechanical automatic gaming machine of claim 1, wherein the electro-mechanical automatic gaming machine includes a roulette wheel and a roulette style ball, and is adapted to:

rotate the roulette wheel at a randomly determined rotational speed; and mechanically propel the roulette style ball onto the rotating wheel at a randomly determined velocity and a randomly determined spin.

3. The electro-mechanical automatic gaming machine of claim 1, wherein the electro-mechanical automatic gaming machine includes a roulette wheel and a roulette style ball, and is adapted to mechanically propel the roulette style ball onto the rotating wheel at a randomly determined velocity.

4. The electro-mechanical automatic gaming machine of claim 1, wherein the electro-mechanical automatic gaming machine includes a roulette wheel and a roulette style ball, and is adapted to mechanically propel the roulette style ball onto the rotating wheel at a randomly determined spin.

5. The electro-mechanical automatic gaming machine of claim 1, wherein:

the electro-mechanical automatic gaming machine includes a platform for supporting a die having a plurality of surfaces each bearing indicida unique to that on the other surfaces; and the electro-mechanical gaming machine is adapted to move the platform at a randomly determined direction and speed.

6. The electro-mechanical automatic gaming machine of claim 1, wherein the electro-mechanical automatic gaming machine is adapted to be activated and interactively played upon demand by bi-directional network communication with a remote client.

7. The electro-mechanical automatic gaming machine of claim 1, wherein the electro-mechanical automatic gaming machine is adapted to transmit the live video feed to the plurality of emote clients through one or more of the following networks: satellite, cable television, the Internet, the World Wide Web, a Wide Area Network (WAN), a Local Area Network (LAN), a wireless network and a hard wired network.

8. The electro-mechanical automatic gaming machine of claim 1, wherein the electro-mechanical automatic gaming machine includes one of the following games or a combination thereof: a roulette, a dice game, a big six wheel game, a wheel of fortune game and a board games of chance.

9. The electro-mechanical automatic gaming machine of claim 1, wherein the electro-mechanical automatic gaming machine is adapted to receive a communication from the remote client for a selection to initiate a game.

10. The electro-mechanical automatic gaming machine of claim 1, wherein the electro-mechanical automatic gaming machine is adapted to be:

activated by receipt of a command from the remote client; and interactively played by commands received from the remote client.

11. The electro-mechanical automatic gaming machine of claim 1, wherein the electro-mechanical automatic gaming machine is adapted to:

receive funding for the wager;

deduct the wager from the funding for a loss of the wager; and transmit data regarding an amount of funds for the winning of the wager.

12. A roulette table game system comprising:

A roulette wheel for play a roulette-style game with a roulette style ball;

wherein the roulette table game system is adapted to, in an unattended manner:

rotate the roulette wheel at a randomly determined rotational speed;

mechanically propel a roulette style ball onto the roulette wheel at a randomly determined velocity;

receive a communication from one of a plurality of remote clients operated by players to initiate the play of the roulette-style game;

transmit a video feed of live game play by a communication network for receipt by the plurality of remote clients;

produce an analog result of play of the roulette-style game without any player control;

convert the analog result into a digital result;

transmit the digital result over the network to the plurality of remote clients.

13. The roulette table game system of claim 12, wherein the roulette table game system is adapted to be played interactively by commands received from the remote client through a communication network.

14. A dice game table for playing a dice-style game, the dice table comprising:

a platform for supporting a die having a plurality of surfaces each bearing indicia unique to that on the other surfaces;

wherein the dice game table is adapted to, in an unattended manner:

randomly change the movement and speed of the platform relative to the die;

receive a communication from one of a plurality of remote clients;

transmit a video feed of live game play at the dice game table through a communication network for receipt by the plurality of remote clients;

produce an analog result of the play of the dice-style game at the dice game table without any player control;

convert the analog result into a digital result; and transmit the digital result for transmission over the network to the plurality of remote clients.

15. The dice game table as defined in claim 12, wherein the dice game table is adapted to be interactively played by commands received from the remote client by a communication network.

* * * * *